(12) United States Patent
Mildner et al.

(10) Patent No.: US 8,662,574 B2
(45) Date of Patent: Mar. 4, 2014

(54) BODY STRUCTURE FOR MOTOR VEHICLE

(75) Inventors: Udo Mildner, Limburg (DE); Juergen Hulbert, Eltville (DE); Martin Schwarz, Stadecken-Elsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 310 days.

(21) Appl. No.: 12/975,037

(22) Filed: Dec. 21, 2010

(65) Prior Publication Data

US 2011/0148152 A1 Jun. 23, 2011

(30) Foreign Application Priority Data

Dec. 21, 2009 (DE) .......................... 10 2009 059 827

(51) Int. Cl.
*B62D 25/20* (2006.01)
*B62D 21/03* (2006.01)
(52) U.S. Cl.
USPC ................. 296/204; 296/187.08; 296/203.04; 296/29
(58) Field of Classification Search
USPC ............. 296/187.08, 187.11, 187.12, 193.07, 296/193.05, 193.08, 203.03, 203.04, 204, 296/29, 209
See application file for complete search history.

(56) References Cited

U.S. PATENT DOCUMENTS

| | | | |
|---|---|---|---|
| 3,202,451 A | 8/1965 | Auger et al. | |
| 5,573,294 A * | 11/1996 | Mack | 296/97.23 |
| 6,139,094 A * | 10/2000 | Teply et al. | 296/203.03 |
| 6,227,322 B1 | 5/2001 | Nishikawa | |
| 6,227,610 B1 | 5/2001 | Iwatsuki et al. | |
| 7,204,547 B2 * | 4/2007 | Okana et al. | 296/204 |
| 7,270,369 B2 * | 9/2007 | Okana et al. | 296/204 |
| 7,500,714 B2 * | 3/2009 | Abe et al. | 296/193.07 |
| 7,556,310 B2 * | 7/2009 | Miki | 296/204 |
| 8,052,204 B2 * | 11/2011 | Boettcher et al. | 296/193.07 |
| 8,128,154 B2 * | 3/2012 | Egawa et al. | 296/187.12 |
| 8,186,735 B2 * | 5/2012 | Maceri et al. | 296/37.14 |
| 2001/0028179 A1 | 10/2001 | Takemoto et al. | |
| 2005/0082878 A1 * | 4/2005 | Yamada et al. | 296/204 |
| 2006/0061143 A1 * | 3/2006 | Okana et al. | 296/204 |
| 2010/0066125 A1 | 3/2010 | Egawa et al. | |

(Continued)

FOREIGN PATENT DOCUMENTS

| | | |
|---|---|---|
| EP | 0298903 A2 | 1/1989 |
| EP | 0937630 A2 | 8/1999 |
| EP | 2141064 A1 | 1/2010 |
| GB | 910039 A | 11/1962 |

OTHER PUBLICATIONS

German Patent Office, German Search Report for German Application No. 102009059827.8, dated Oct. 21, 2010.

(Continued)

*Primary Examiner* — Glenn Dayoan
*Assistant Examiner* — Gregory Blankenship
(74) *Attorney, Agent, or Firm* — Ingrassia Fisher & Lorenz, P.C.

(57) ABSTRACT

A body structure is provided for a motor vehicle that includes, two side sills running in the vehicle longitudinal direction, between which a floor group is situated, and two rear frame profiles rigidly connected to the floor group, which extend from the floor group to the rear. The body structure has a structure crossbeam running in the vehicle transverse direction, which rigidly connects each of the two side sills and also the two rear frame profiles directly to one another.

19 Claims, 11 Drawing Sheets

(56) References Cited

U.S. PATENT DOCUMENTS

2010/0078968 A1* 4/2010 Boettcher et al. ........ 296/193.07
2011/0260503 A1* 10/2011 Fujii et al. .................... 296/205
2012/0169089 A1* 7/2012 Rawlinson et al. ...... 296/193.08

OTHER PUBLICATIONS

British Patent Office, British Search Report for British Application No. 1021355.1, dated Mar. 24, 2011.

* cited by examiner

BODY STRUCTURE FOR MOTOR VEHICLE

CROSS-REFERENCE TO RELATED APPLICATION

This application claims priority to German Patent Application No. 102009059827.8, filed Dec. 21, 2009, which is incorporated herein by reference in its entirety.

TECHNICAL FIELD

The technical field generally relates to automotive engineering and relates, according to its species, to a body structure for a motor vehicle, which comprises two side sills running in the vehicle longitudinal direction, between which a floor group is situated, and two rear frame profiles rigidly connected to the floor group, which extend from the floor group to the rear.

BACKGROUND

Modern motor vehicles are typically provided with a self-supporting body, which allows a weight and cost reduction in comparison to a body constructed on a frame. In the self-supporting body, the components in their entirety absorb the introduced forces, the rigidity of the body being achieved by hollow profiles ("shells") and a compact sheet-metal outer skin.

In a construction known to those skilled in the art, for example, from the industrial mass production of motor vehicles, as of the model "Opel Corsa", self-supporting bodies have an underfloor, which terminates the passenger compartment on the bottom, and which is connected to the vehicle roof via a plurality of laterally situated vertical struts ("columns"). The underfloor comprises a plurality of hollow profiles, which are rigidly connected to one another during the vehicle manufacturing by welding, clinching, riveting, or another fastening technique. The hollow profiles are typically manufactured from an iron metal material (sheet metal), light metal materials also being used for the purposes of weight reduction. The hollow profiles form a frame-like structure, which is closed on top using floor plates.

In particular the bodies of modern motor vehicles comprise two side sills situated in the vehicle longitudinal direction as hollow profiles, between which the components of the so-called "floor group" are situated in the area of the passenger compartment, and a central tunnel running along the central longitudinal axis, as well as seat crossbeams running in the vehicle transverse direction, which are connected to the central tunnel and the two side sills. The two side sills are connected to one another at the front by a transverse profile, for example, the transverse profile being attached to a front wall, by which a spatial separation is provided between the passenger compartment and the body front structure located in front of the passenger compartment. The central tunnel extends from the front wall to the rear up to the so-called heel plate, which provides a transition between the floor plates of the passenger compartment and the floor plates in the area of the baggage compartment, which are placed higher.

Furthermore, the body typically comprises a front frame structure for stiffening the body front structure and a rear frame structure for stiffening the body rear structure, which is located behind the passenger compartment, which each have a longitudinal girder rigidly connected to the subfloor, which are rigidly connected to one another via transverse profiles. A front or rear crash load path, respectively, is formed by the two frame structures, by which forces absorbed in the case of a vehicle collision may be introduced into the vehicle floor and in particular into the side sill structure.

In front of the background of increasingly stricter legal requirements on the pollutant emission of motor vehicles, it is desirable to make the vehicles as light as possible to reduce the overall fuel consumption, on the one hand, and to provide the body with sufficient rigidity, on the other hand, so that the passenger compartment is pushed in as little as possible in particular in the case of a lateral collision. A conflict of goals is thus to be solved, in that the highest possible twisting or torsion stiffness of the vehicle body is to be achieved at the lowest possible vehicle weight, in order to protect the vehicle occupants as well as possible in case of a collision. In addition, the endurance running behavior of the body is to meet the high requirements which are placed on the running performance of modern motor vehicles. It is also essential in this case that the body can be manufactured using the lowest possible production and material costs.

In relation thereto, at least one object comprises refining a typical body of a motor vehicle advantageously. In addition, other objects, desirable features and characteristics will become apparent from the subsequent summary and detailed description, and the appended claims, taken in conjunction with the accompanying drawings and this background.

SUMMARY

A body structure for a motor vehicle is shown according to an embodiment. The body structure of the species under discussion comprises two side sills running essentially in the vehicle longitudinal direction, between which a floor group forming the vehicle floor is situated below the passenger compartment of the motor vehicle. As is typical, the floor group is assembled from a plurality of hollow profiles, which form a frame-like structure, which is closed on top using floor plates. The body structure further comprises two rear frame profiles rigidly connected to the floor group, which extend from the floor group to the rear. Body structures according to the species are well known, as was already shown at the beginning, to those skilled in the art from the industrial mass production of motor vehicles of the model "Opel Corsa", for example, so that they do not have to be discussed in greater detail here.

The body structure has a structure crossbeam running in the vehicle transverse direction, which directly rigidly connects both the two side sills and also the two rear frame profiles to one another. The torsional stiffness of the body may advantageously be improved by this measure; in particular the side impact protection being able to be improved by the structural attachment of the structure crossbeam to the side sills and the rear frame profiles. Further advantages of the invention result from the description of the exemplary embodiment of the invention.

In another embodiment of the body structure, the floor group comprises a heel plate, which rigidly connects the two side sills to one another, and which produces a rigid connection between floor plates situated at different heights, the structure crossbeam being situated close to the heel plate. It can be particularly preferable if the structure crossbeam is rigidly connected to the heel plate to form a box-shaped profile structure. Through this measure, the torsional stiffness of the body can be improved particularly effectively, in particular with respect to the side impact protection. The structure crossbeam can have an L-shape in section perpendicular to the vehicle transverse direction for this purpose, for example. The heel plate can also have an L-shape in section perpendicular to the vehicle transverse direction, which is adapted to the L-shape of the structure crossbeam to form a profile structure that is at least approximately rectangular in section, whereby the box-shaped profile structure is to be implemented in a particularly simple manner. In a further embodiment of the body structure, the rear frame profiles each have one wall oriented at least approximately in the vehicle vertical direction, which is frontally rigidly connected to the structure crossbeam. In addition, the structure crossbeam is rigidly connected in each case to a floor-side wall of the rear frame profiles, the structure crossbeam further being frontally rigidly connected to the two side sills. Through this measure, the torsional stiffness of the body can be particularly effectively improved, in particular with respect to the side impact protection.

In an embodiment of the body structure, the structure crossbeam, jointly with the rear frame profiles and the side sills, forms frame-shaped profile structures in each case, so that it can be advantageous in particular if the body structure has closing plates, by which the frame-shaped profile structures are closed to form box-shaped profile structures. Through this measure, the torsional rigidity of the body can be particularly effectively improved, in particular with respect to the side impact protection.

In an embodiment of the body structure, it has a central tunnel running along a central longitudinal axis, which is rigidly connected to the box-shaped profile structure formed from structure crossbeam and heel plate. It can be particularly advantageous if the central tunnel, in relation to the vehicle longitudinal direction, has a profile height decreasing toward the heel plate, so that the profile height of the structure crossbeam can be increased. Through this measure, the torsional stiffness of the body can be particularly effectively improved, in particular with respect to the side impact protection.

In a further embodiment of the body, the rear frame profiles are each rigidly connected to a box-shaped structure component situated below the rear frame profiles. Through this measure, the torsional stiffness of the body can be particularly effectively improved, in particular with respect to the rear impact protection.

The structure crossbeam is manufactured from an iron metal material, for example, such as steel plate. Alternatively, it can be manufactured from a light metal material, for example, aluminum or an aluminum alloy. Furthermore, the structure crossbeam for a vehicle body of a motor vehicle, which is suitably implemented for the direct rigid connection of two side sills running in the vehicle longitudinal direction, between which a floor group is situated, and for the direct rigid connection of two rear frame profiles, which are rigidly connected to the floor group, and which extend from the floor group to the rear. In addition, the structure crossbeam is implemented so that it is rigidly connectable to a heel plate, which rigidly connects the two side sills to one another, and which produces a rigid connection between floor plates situated at various heights, to form a box-shaped profile structure.

Furthermore, a motor vehicle is equipped with a body structure or vehicle body as described above.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

It is to be noted that location and direction specifications made hereafter, such as "top", "bottom", "lateral", "longitudinal", "transverse", "left", "right", "outside", "inside", "central", "horizontal", "vertical", etc., relate to the orientation of the components of the exemplary body structure illustrated in the figures. They are only used for the purpose of simpler description of the invention, without the invention being restricted thereto. In the figures, directions related to the motor vehicle are typically specified by x, y, z, the x direction specifying the vehicle longitudinal direction, the y direction the vehicle transverse direction, and the z direction the vehicle vertical direction. The forward travel direction corresponds to the negative x direction (−x).

Figure 1:
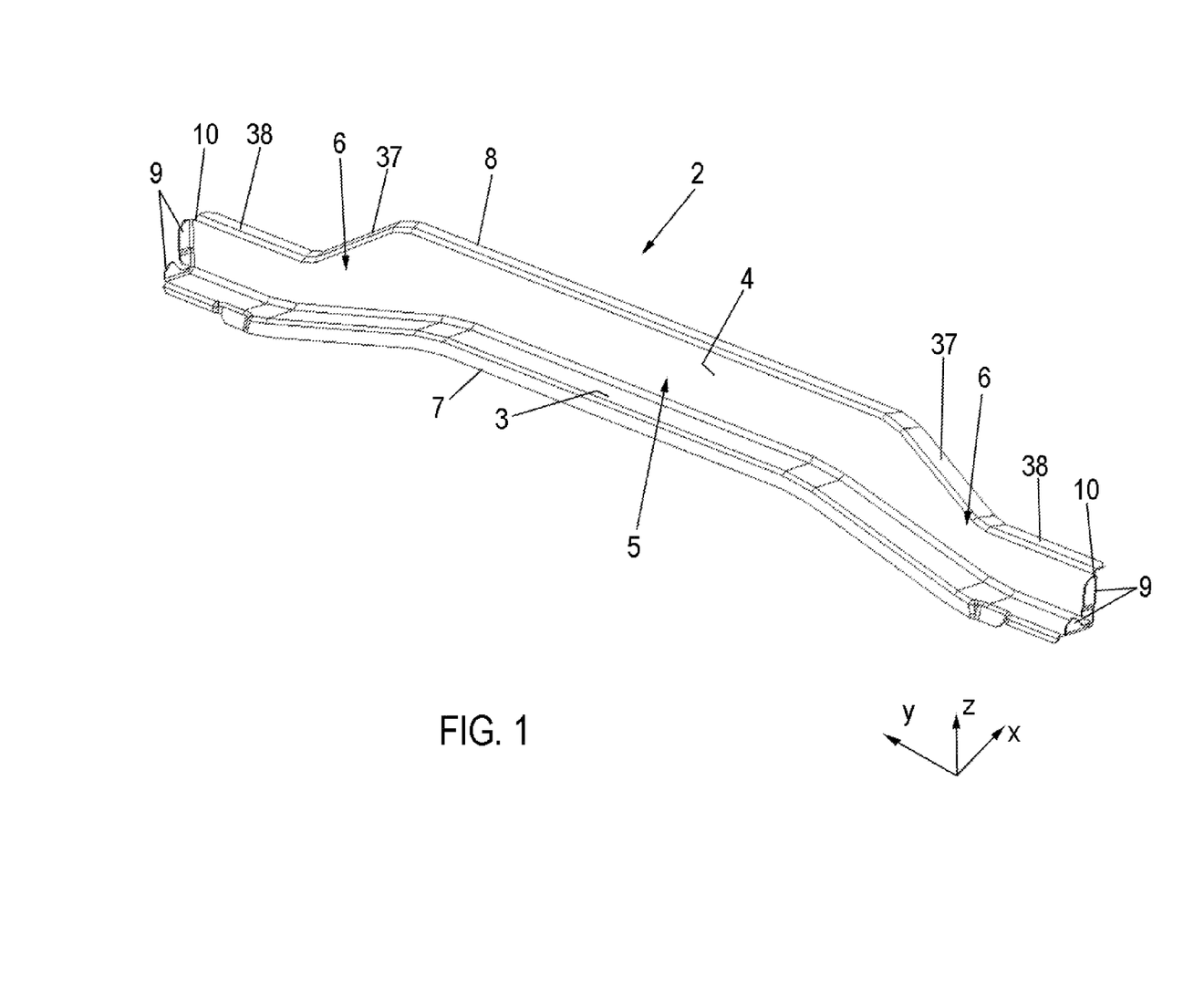
FIG. 1 shows a perspective view of a structure crossbeam for a body structure.

An exemplary embodiment of the structure crossbeam 2 for a body structure of a motor vehicle, identified in general by the reference numeral 1, is shown in a perspective view from the front in FIG. 1. As is specified in FIG. 1, the oblong structure crossbeam 2 extends essentially in the vehicle transverse direction (y) in the installed location. It is assembled from a horizontally oriented girder section 3 and a vertically oriented girder section 4, which are both implemented flatly and essentially extend in the vehicle transverse direction (y). In section in a plane perpendicular to the vehicle transverse direction (y), the structure crossbeam 2 has an L-shape having two approximately perpendicular legs, one leg resulting through the horizontal girder section 3 and the other leg through the vertical girder section 4.

Furthermore, the structure crossbeam 2 has an at least approximately horizontal middle section 5 and two side sections 6 adjoining thereon, which have a shape bent downward in relation to the middle section 5. The side sections 6 are each assembled from a first side part 37, which adjoins the middle section 5 and runs diagonally downward, and a second side part 38, which laterally adjoins thereon and is approximately horizontal. With respect to a central longitudinal axis (not shown), which extends centrally to the vehicle or the body structure 1 in the vehicle longitudinal direction (x) and centrally traverses the middle section 5 of the structure crossbeam 2 in the installed location, the structure crossbeam 2 has a symmetrical construction.

The horizontal girder section 3 of the structure crossbeam 2 has a first fastening flange 7, which protrudes in vertical orientation from the first girder section 3, on a front edge in the area of the middle section 5 and the two side sections 6. In a corresponding way, an upper edge of the vertical girder section 4 is provided with a second fastening flange 8, which protrudes in horizontal orientation from the second girder section 4, in the area of the middle section 5 and the two side sections 6. On each of its two frontal ends 10, the structure crossbeam 2 is additionally provided with third fastening flanges 9, which are each shaped onto the first girder section 3 and the second girder section 4 and have a vertical orientation. The various fastening flanges 7-9 are produced here in the bending method, for example, it also being conceivable to join the fastening flanges 7-9 as individual parts to the respective girder sections 3, 4 by a typical connection technique such as welding, riveting, or clinching. The attachment of the structure crossbeam 2 within the body structure 1 by the fastening flanges 7-9 is explained in greater detail below.

Figure 2:
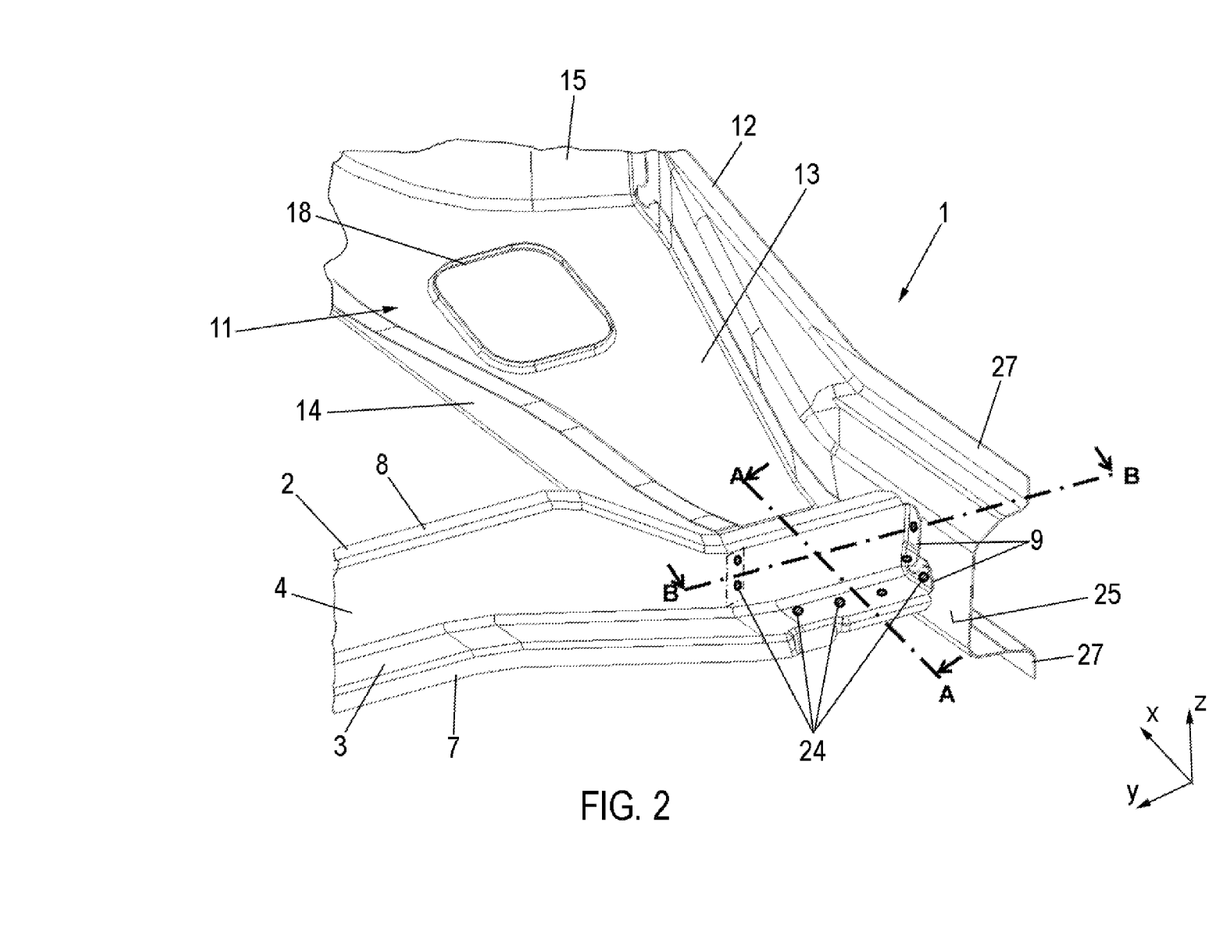
FIG. 2 shows a perspective detail view of an exemplary body structure having the structure crossbeam of FIG. 1.
Figure 3:
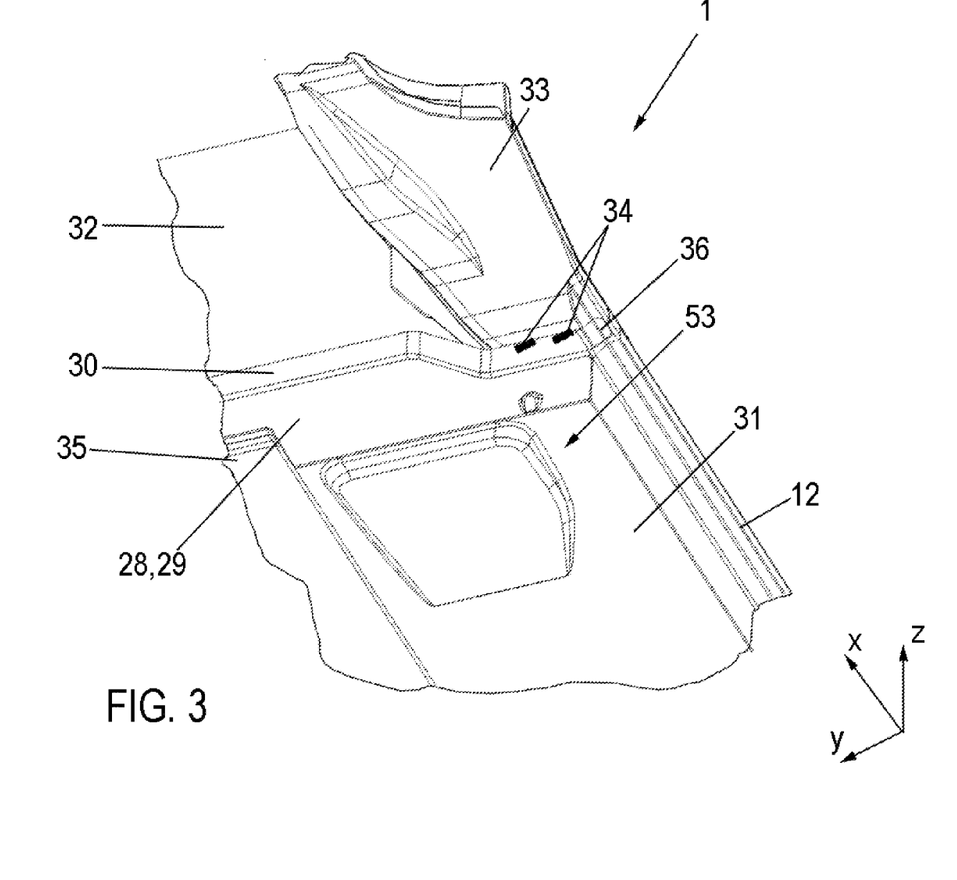
FIG. 3 shows a further perspective detail view of the body structure having heel plate and floor plates.
Figure 4:
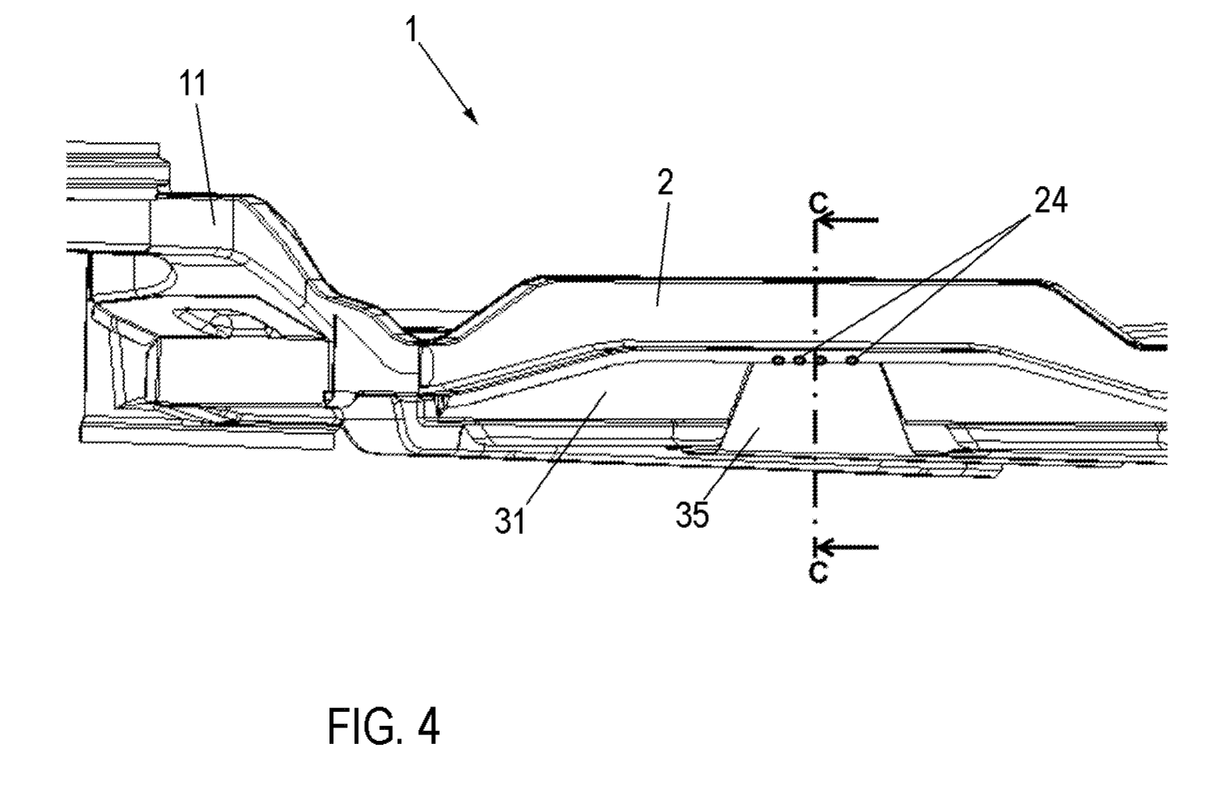
FIG. 4 shows a further perspective detail view of the body structure.

An exemplary embodiment of the body structure 1 is illustrated in FIG. 2 to FIG. 4 on the basis of various perspective views. Only parts of the body structure 1 are shown in each of the perspective views, it being obvious that the body structure 1 has a symmetrical construction with respect to the above-mentioned central longitudinal axis. The specifications "left" and "right" relate here and hereafter to the relative location of components with respect to the central longitudinal direction with viewing direction toward the vehicle front.

A left section of the body structure 1 is shown in FIG. 2 on the basis of a perspective view from the front. Accordingly, the body structure 1 comprises the structure crossbeam 2, of which only its left side section 6 is shown in FIG. 2. The body structure 1 further comprises a rear frame having two rear frame profiles 11 running from back to front, to which a bumper crossbeam (not shown) can be attached. Only the left rear frame profile 11 of the rear frame is shown in FIG. 2. Furthermore, the body structure 1 comprises two side sills, which each extend in the vehicle longitudinal direction (x), only a U-shaped profiled inner profile 27 of the left side sill 12 being shown in FIG. 2. In the finished installed state, the two inner profiles 27 are closed by closing plates (not shown) fastened on sill flanges 26 to form a box-shaped body structure, whereby the side sills 12 are formed.

Figure 8:
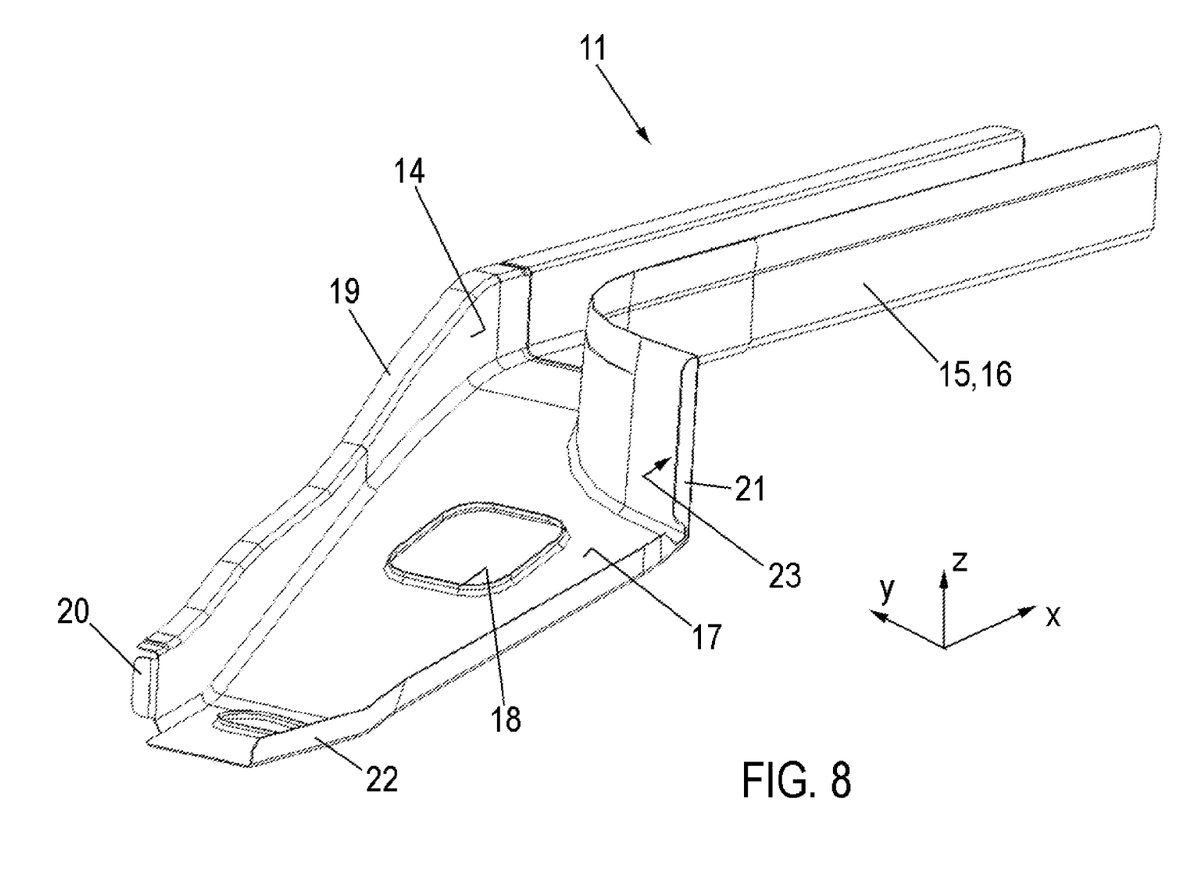
FIG. 8 shows a perspective view of a rear frame profile of the body structure.

As may be inferred in particular from a perspective individual view of the rear frame profile 11 in FIG. 8, each rear frame profile 11 can be at least conceptually divided into various areas. The rear frame profile 11 thus comprises an oblong frame section 16, which is at least approximately profiled in a U-shape in section in the vehicle transverse direction (y), the U-shape resulting from two vertically oriented side walls, namely an inner side wall 14 and an outer side wall 15, and a horizontally oriented floor wall 13. The two side walls 14, 15 extend approximately in the vehicle longitudinal direction (x). The frame section 16 merges at the front into an area referred to overall as the rear axle attachment 17, which widens in the vehicle transverse direction (y) and is essentially formed from the inner side wall 14 and the floor wall 13.

In the rear axle attachment 17, the outer side wall 15 ends further to the rear than the inner side wall 14 and also changes its course direction by approximately 90° outward, so that an end section of the outer side wall 15 extends toward the vehicle outer side. A recess 23 is thus provided, which is closed by the side sill 12 or its inner profile 27.

In the rear frame profile 11, an upper edge of the inner side wall 14 is provided with a fourth fastening flange 19, which protrudes perpendicularly from the inner side wall 14 and has a horizontal orientation. Furthermore, a frontal edge of the inner side wall 14 is provided with a fifth fastening flange 20, which protrudes perpendicularly from the inner side wall 14 and has a vertical orientation. Furthermore, a frontal edge of the outer side wall 15 is provided with a sixth fastening flange 21, which protrudes perpendicularly from the inner side wall 14 and has a vertical orientation. In addition, an external lateral edge of the floor wall 13 in front of the outer side wall 15 is provided with a seventh fastening flange 22, which protrudes perpendicularly from the inner side wall 14 and has a vertical orientation.

With reference to FIG. 2 and FIG. 3, the attachment of the structure crossbeam 2 to the two rear frame profiles 11 and the two side sills 12 of the body structure 1 will be explained in greater detail. Accordingly, in the body structure 1, the structure crossbeam 2 is rigidly connected to both the two rear frame profiles 11 and also the two side sills 12. The structure crossbeam 2 is thus fastened, on the one hand, on its two frontal ends 10 via the third fastening flanges 9 to vertically oriented wall sections 25 of the inner profiles 27 of the side sills 12 by spot welds 24, so that the two side sills 12 are rigidly connected to one another by the structure crossbeam 2. On the other hand, the two rear frame profiles 11 are connected on their inner side walls 14 via the fifth fastening flanges 20 to the horizontal second girder section 4 of the structure crossbeam 2 using spot welds 24, so that not only the two side sills 12, but rather also the two rear frame profiles 11 are rigidly connected to one another by the structure crossbeam 2. Therefore, both a direct connection between the two rear frame profiles 11 and also a direct connection between the two side sills 12 is provided by the structure crossbeam 2, by which effective and reliable stiffening of the vehicle body can be achieved in particular in the vehicle transverse direction (y).

As is obvious in FIG. 2, the rear axle attachment 17 is supplemented by the inner profile 27 of the side sill 12 and the second side part 38 of the side section 6 of the structure crossbeam 2 to form a frame-shaped profile structure, whose components are rigidly connected to one another.

As can be inferred from FIG. 3, in the body structure 1, the structure crossbeam 2 is supplemented by a heel plate 28 running in the vehicle transverse direction (y) to form a box-shaped profile structure. The heel plate 28 is assembled for this purpose from a vertically oriented plate section 29 and a horizontally oriented plate section 30. Both plate sections 29, 30 are implemented flatly and extend essentially in the vehicle transverse direction (y). In section in a plane perpendicular to the vehicle transverse direction (y), the heel plate 28 has an L-shape adapted to the structure crossbeam 2, having two approximately perpendicular legs, one leg resulting through the first plate section 29 and the other leg through the second plate section 30. The stiffness of the body structure 1 can be reliably and securely improved in an efficient manner, in particular in the vehicle transverse direction (y), by the box-shaped profile structure formed from the structure crossbeam 2 and the heel plate 28.

As is typical, the heel plate 28 produces a rigid connection between a front floor plate 31 in the area of the rear seats and a rear floor plate 32, which is located higher, in the area of the luggage compartment. The heel plate 28 is integrated in the front floor plate 31 here, for example, but it could also be integrated in the rear floor plate 32. It would also be conceivable to join the heel plate 28 and the two floor plates 31, 32 to one another as individual parts by a typical connection technique such as welding, riveting, or clinching. The heel plate 28 is additionally fastened via a lateral fastening tabs on the two inner profiles 27 of the side sills 12 using welded bonds, for example, and thus directly connects the two side sills 12 to one another.

As is further recognizable in FIG. 3, the frame-shaped profile structure, which is assembled from the rear axle attachment 17, the inner profile 27 of the side sill 12, and the second side part 38 of the side section 6 of the structure crossbeam 2, is supplemented by a (rear frame) closing plate 33 to form a box-shaped closed profile structure. The closing plate 33 is rigidly connected for this purpose to the fourth fastening flange 19 of the inner side wall 14 of the rear frame profile 11 and the sill flange 26 of the inner profile 27 of the side sill 12 by welded bonds, for example. The stiffness of the body structure is improved by this measure. In addition, the heel plate 28 or the upper horizontal plate section 30 is fixedly connected by a plurality of $CO_2$ spot welds 34 to the closing plate 33.

Figure 5:
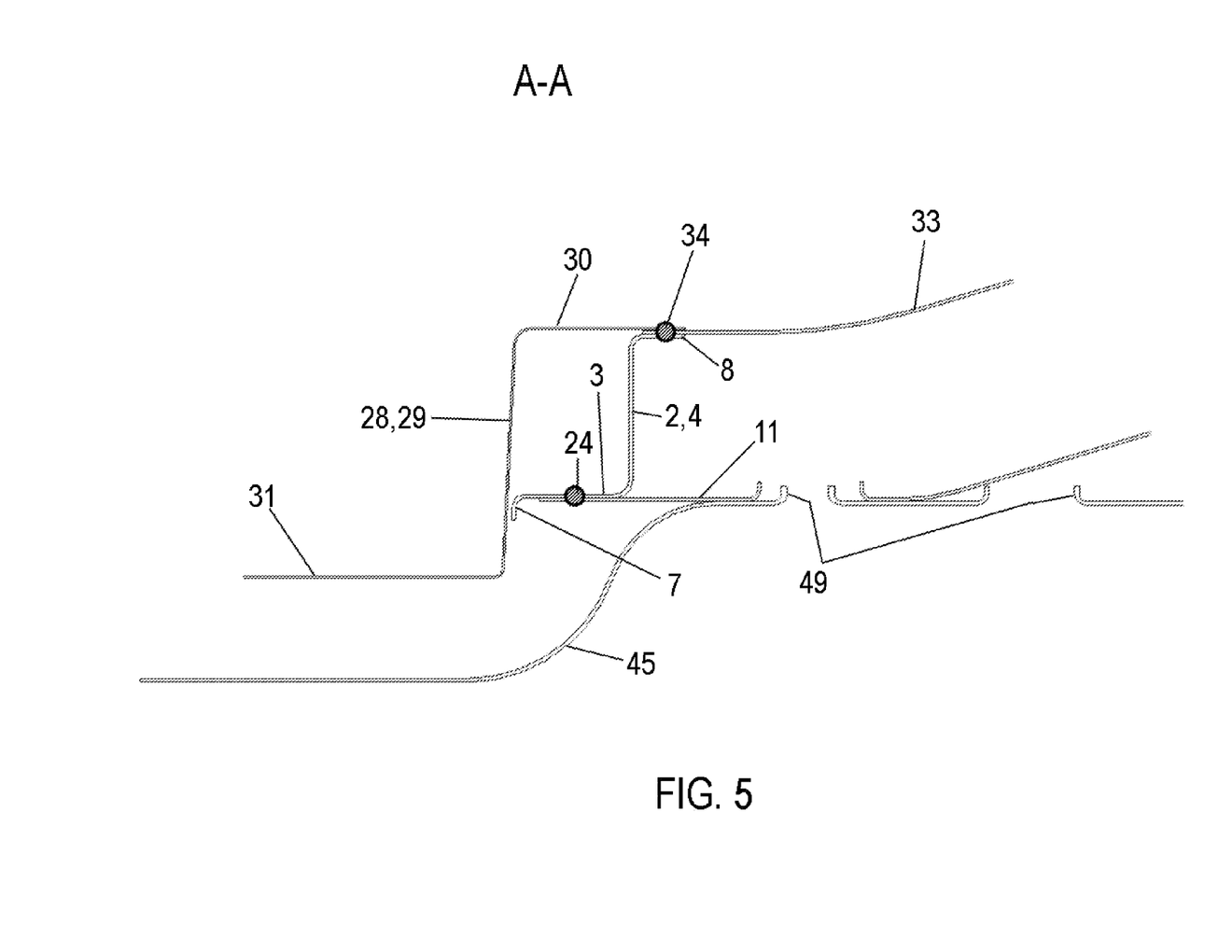
FIG. 5 shows a sectional view of the body structure along section line A-A of FIG. 2.

The profile structure, which is closed in section, made of structure crossbeam 2 and heel plate 28 is well recognizable in particular in the sectional view of FIG. 5, in which a section along section line A-A is shown. It is also recognizable in this sectional view that the front floor plate 31 or the heel plate 28 is fixedly connected to the first fastening flange 7 of the first girder section 3 of the structure crossbeam 2, for example, by a welded bond. In addition, the rear floor plate 32 and the closing plate 33, jointly with the heel plate 28, are fixedly connected to the second fastening flange 8 of the second girder section 4 of the structure crossbeam 2, for example, by a welded bond. Furthermore, the closing plate 33 is fixedly connected to the fourth fastening flange 19 of the inner side wall 14 of the rear frame profile 11, for example, by a welded bond.

Figure 6:
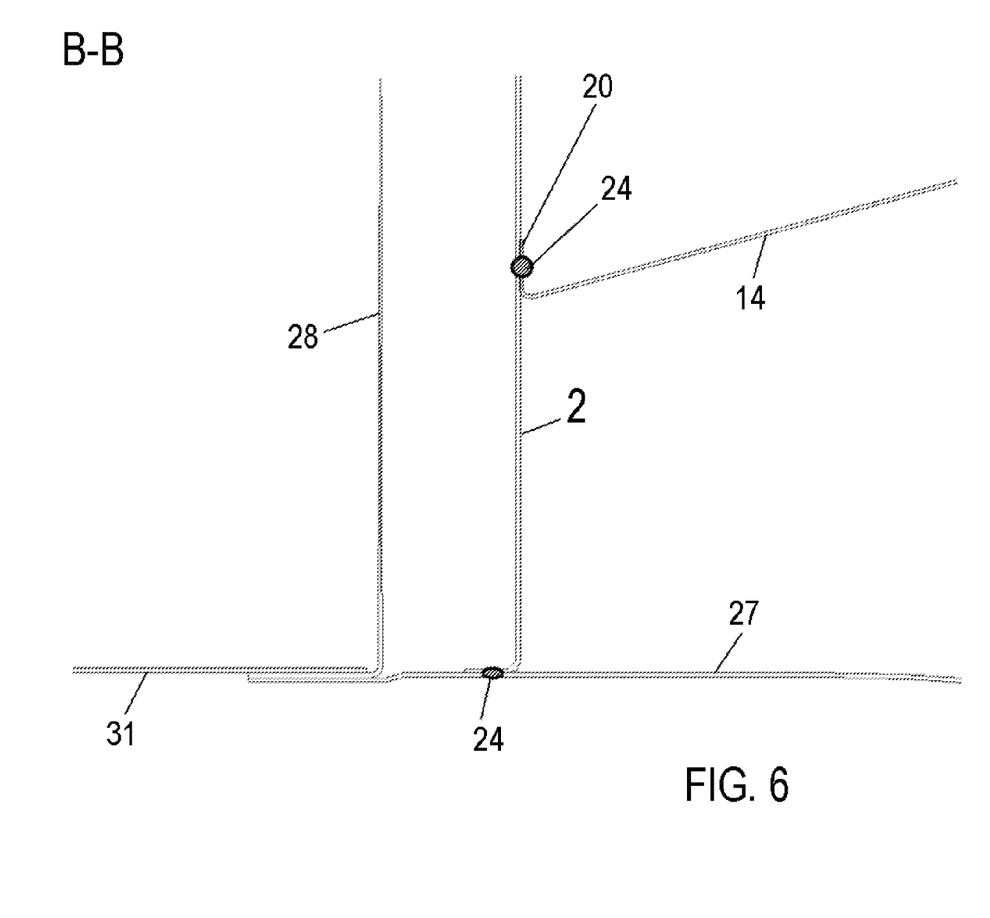
FIG. 6 shows a sectional view of the body structure along section line B-B of FIG. 2.

In the sectional view of FIG. 6, in which a section along section line B-B is shown, it is indicated that the front floor plate 31 is fastened on the inner profile 27 of the side sill 12 by a welded bond, for example. In addition, it is recognizable that the fifth fastening flange 20 of the inner side wall 14 of the rear frame profile 11 is rigidly connected to the structure crossbeam 2 by spot welds 24.

Furthermore, a central tunnel 35 is recognizable in FIG. 3, which extends in the area of the central longitudinal axis of the body structure 1 between the two side sills 12 in the vehicle longitudinal direction (x) and is fixedly connected to the heel plate 28 and a vertical front wall (not shown in the figures) by welded bonds, for example. As usual, a spatial separation between the passenger compartment and the vehicle body front structure is provided by the vertical front wall, which is situated essentially in the vehicle transverse direction.

Figure 11:
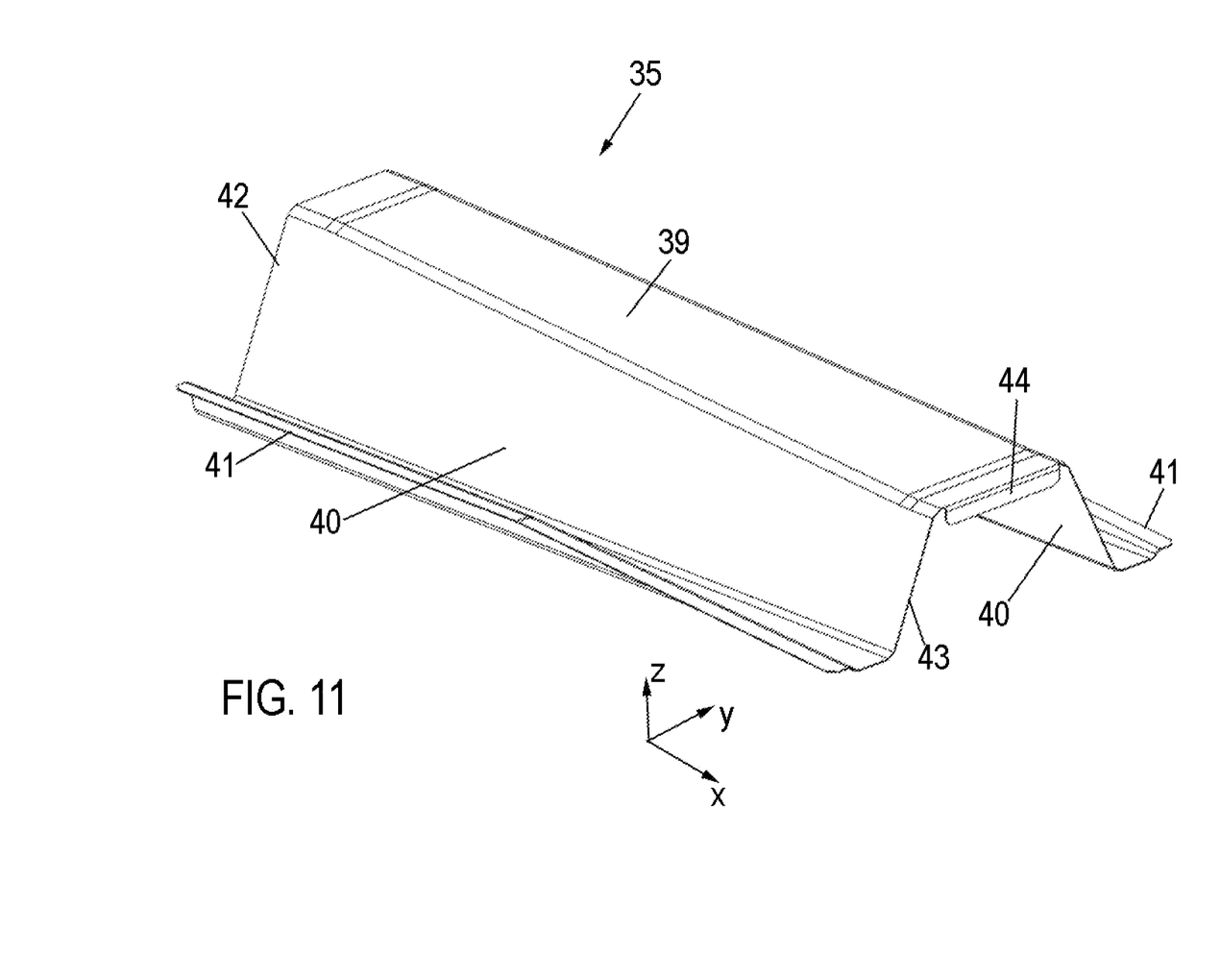
FIG. 11 shows a perspective view of the central tunnel of the body structure.

FIG. 4 shows a perspective view from the rear of the structure crossbeam 2, which is fastened together with the heel plate 28 by spot welds 24 on the central tunnel 35. The central tunnel 35 is recognizable in a perspective view in FIG. 11. Accordingly, the central tunnel 35 comprises a horizontal tunnel cover wall 39 and two tunnel side walls 40 protruding laterally downward, whose longitudinal edges are each provided with an eighth fastening flange 41, which is used for fastening the front floor plates 31. A frontal attachment area 42 is used for connecting the central tunnel 35 to the front wall of the body structure 1. A rear attachment area 43 is used for connecting the central tunnel 35 to the heel plate 28 and the structure crossbeam 2. For this purpose, the rear attachment area 43 is provided on its frontal edge in the area of the tunnel cover wall 39 with a ninth fastening flange 44, which is fixedly connected to the structure crossbeam 2 via a welded bond, for example. The rear attachment area 43 obviously has a lesser profile height measured in the vehicle vertical direction (z) than the frontal attachment area 42, so that the structure crossbeam 2 can have a greater profile height measured in the vehicle vertical direction (z), whereby the torsional rigidity of the vehicle body is improved.

Figure 7:
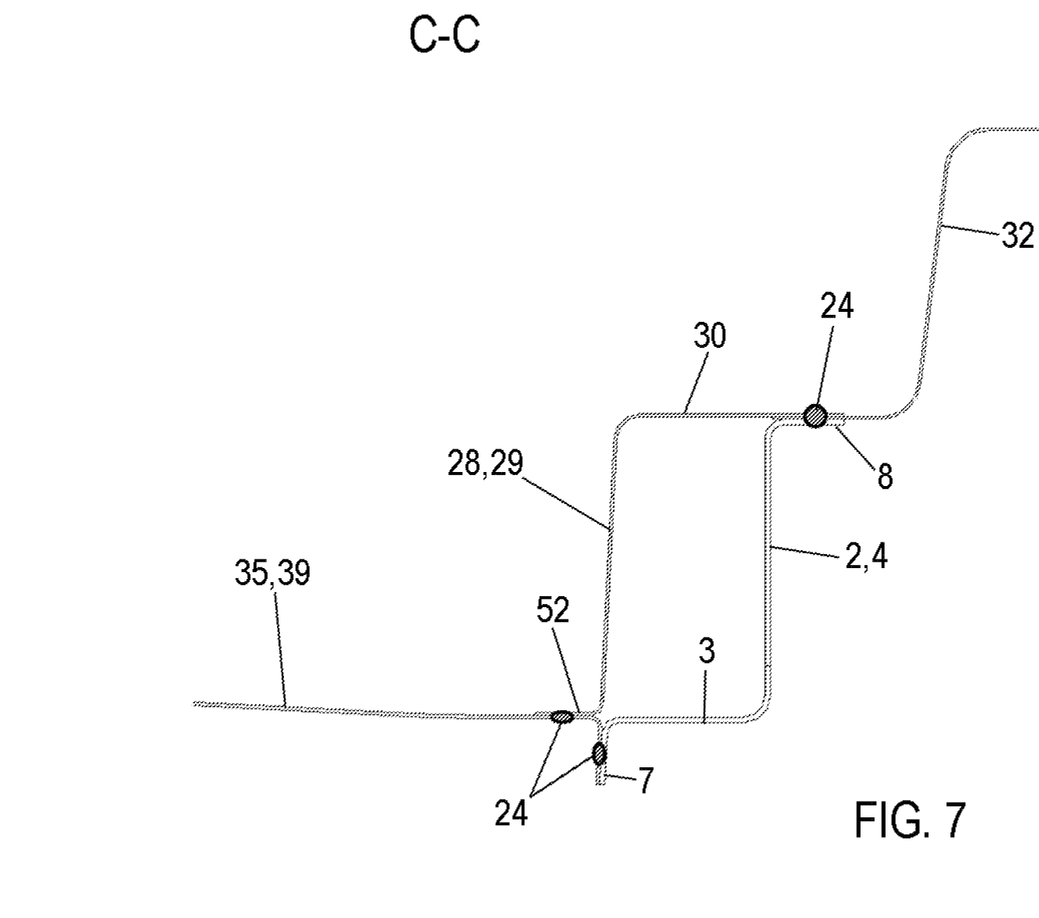
FIG. 7 shows a sectional view of the body structure along section line C-C of FIG. 4.

In FIG. 7, a section along section line C-C, the connection of the central tunnel 35 to the heel plate 28 and the structure crossbeam 2 is recognizable. In particular, the fastening of the ninth fastening flange 44 of the central tunnel 35 on the first fastening flange 7 of the structure crossbeam 2 as well as the fastening of the heel plate 28 using a horizontally protruding twelfth fastening flange 52 on the tunnel cover wall 39 are shown therein.

Figure 9:
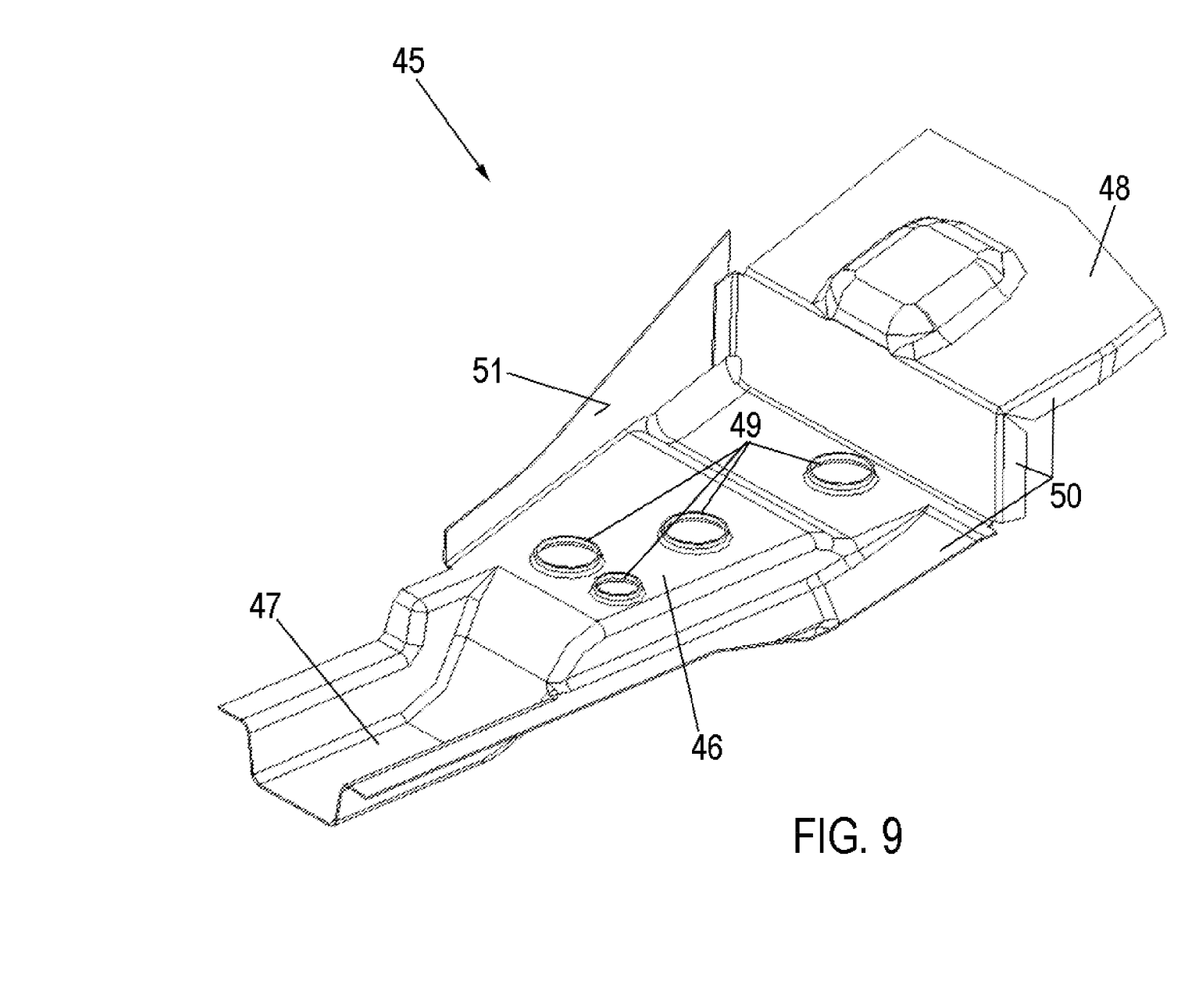
FIG. 9 shows a perspective view of the rear frame extension of the body structure.

The structure parts located between the side sills 12, by which the vehicle floor is formed, are generally referred to as the floor group 53. These include, inter alia, the floor plates 31, 32, the heel plate 28, and the central tunnel 35. Below each rear frame profile 11, a structure part identified as a whole by the reference numeral 45, the so-called "rear frame extension", is provided. The rear frame extension 45 is shown enlarged in FIG. 9 on the basis of a perspective view. Accordingly, the rear frame extension 45 can be divided into various sections. These are, inter alia, a receptacle hole section 46, an attachment section 47, and a reinforcement section 48. The receptacle hole section 46 is provided with a plurality of receptacle holes 49, which are used as a receptacle during the production sequence. These could also be similarly provided in the rear frame profiles 11. The front attachment section 47 is used for attachment to a front frame extension of a front frame of the body structure 1. The reinforcement section 48 is used as an integrated reinforcement for the fastening of the rear axle.

Figure 10:
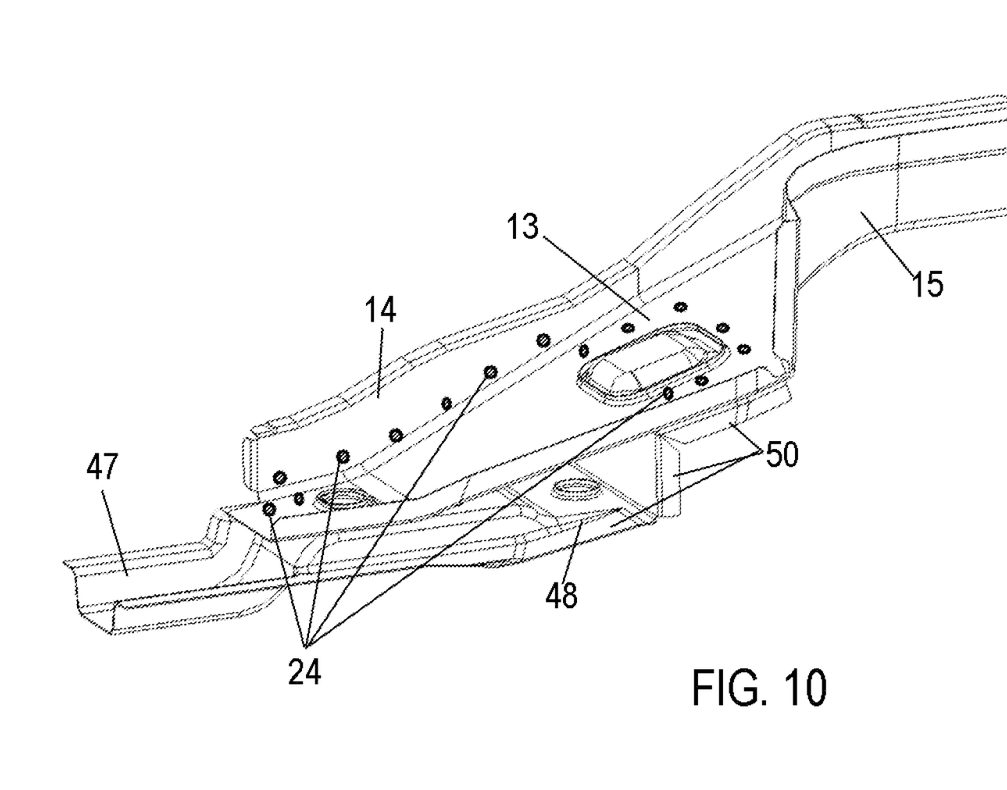
FIG. 10 shows a perspective view of the assembly of the rear frame profile of FIG. 8 and the rear frame extension of FIG. 9.

The assembly of the rear frame profile 11 and the rear frame extension 45 is shown in FIG. 10. Accordingly, the rear frame profile 11 is fixedly connected to the eleventh fastening flange 51 of the rear frame extension 45 by spot welds 24. In addition, the rear axle attachment 17 of the rear frame profile 11 is fixedly connected to the reinforcement section 48 of the rear frame extension 45 by spot welds 24. The tenth fastening flanges 50 of the rear frame extension 45 are used for a connection of the rear frame extension 45 to the inner profile 27 of the side sill 12. A box-shaped profile structure is provided by the rear frame extension 45, which improves the stiffness of the vehicle body.

The rear frame profiles 11 are used together with the rear frame extensions 45 for mounting a rear axle (not shown) of the motor vehicle. For this purpose, an installation hole 18 is provided in the rear axle attachment 17 of the longitudinal profiles 11. For example, a twist-beam rear axle can be mounted on the rear frame profiles 11, which comprises two longitudinal connecting rods connected to one another in a torsionally elastic manner, which are each screwed to the rear frame profiles 11 on their frontal ends via bearing bushes. In the patent literature, twist-beam rear axles are extensively described, for example, in European Patent Specifications EP 0774369 B1 and EP 0681932 B1 of the applicant.

Instead of the spot welds 24, other typical fastening techniques such as riveting or clinching may be used in the body structure 1. The various fastening flanges may also be fastened using other typical fastening techniques such as riveting or clinching on other structure components, instead of by welded bonds. The structure crossbeam 2 and the remaining profile parts of the body structure 1 are produced in one piece by deep drawing from steel plate here, for example. Alternatively, at least some profile parts may be integrally joined from multiple individual parts by a typical connection technique such as welding, riveting, or clinching. Furthermore, at least some profile parts may be produced from a sufficiently stable light metal material instead of steel plate, in particular aluminum or an aluminum alloy. It would also be conceivable to produce at least individual profile parts from a nonmetal material.

A body structure is provided for a motor vehicle, in which a structure part (structure crossbeam) running in the vehicle transverse direction is rigidly attached in the area of the heel plate of the vehicle floor to profile parts running in the longitudinal direction. The profile parts running in the longitudinal direction are the central tunnel, the rear frame profiles, and the side sills. The structure crossbeam is supplemented by the heel plate to form a box-shaped profile structure which is approximately rectangular in section. A connection of the structure crossbeam to the two side sills is performed by fastening flanges, which are rigidly connected to the side sills by a typical connection technique such as welding, riveting, or clinching. The profile height of the central tunnel is reduced continuously up to the attachment to the heel plate, viewed in the vehicle longitudinal direction (x), whereby the possibility exists that the structure crossbeam can have an enlarged profile height in the vehicle vertical direction (z) and the structure crossbeam is rigidly connected to the central tunnel, whereby the stiffness of the body can be improved. The structure crossbeam is drawn laterally to the lower horizontal wall (floor wall) of the rear frame profile and also structurally connected thereto. The inner vertical wall (inner side wall) of the rear frame profile is cut back to the level of the vertical rear wall (second girder section) of the structure crossbeam and provided with a fastening flange running in the vehicle transverse direction. This fastening flange of the rear frame profile running in the vehicle transverse direction is also connected to the structure crossbeam. A box-shaped structure node connection, which has a high torsional stiffness, therefore results in the area of the rear frame profile and the inner side sill structure (inner profile). Through the creation of a large profile height of the structure crossbeam through the profile height of the central tunnel, which is reduced continuously to the rear, a solid buttress is formed, which reduces the penetration values in the event of a side impact or pole impact, since a load introduction occurs directly into the structure crossbeam. The rear frame extension, which is rigidly connected to the rear frame profile via its inner lateral wall (inner side wall) and its lower horizontal wall (floor wall), is implemented as a box-shaped structure part, whereby a supporting profile structure is advantageously formed, which prevents rising and thus uncontrolled folding of the rear frame profile in the event of a rear impact. The rear frame extension can additionally be used as a reinforcement part for the rear axle attachment, so that the use of additional reinforcement parts can be dispensed with.

An optimized structural connection of the structure crossbeam is provided in the area of the heel plate with the possibility of a reduction of the plate thickness and thus the vehicle weight, the torsional rigidity of the vehicle body, in particular with respect to a side impact protection, being able to be improved by the structural attachment of the structure crossbeam to the side sill and the rear frame profiles. In addition, improved endurance running behavior of the vehicle body can be achieved. The manufacturing and material costs may be reduced in industrial mass production.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A body structure for a motor vehicle, comprising:
   two side sills running in a vehicle longitudinal direction;
   structure parts of a floor group situated between the two side sills;
   two rear frame profiles that are rigidly connected directly to the floor group and that extend from the floor group to a rear;
   a structure crossbeam running in a vehicle transverse direction that directly and rigidly connects both the two side sills to the two rear frame profiles; and
   a central tunnel that comprises a profile height that decreases toward the rear in relation to the vehicle longitudinal direction.

2. The body structure according to claim 1,
   wherein the floor group comprises a heel plate that rigidly connects a first side sill of the two side sills to a second side sill of the two side sills and produces a rigid connection between floor plates situated at various heights,
   wherein the structure crossbeam is situated close to the heel plate.

3. The body structure according to claim 2, wherein the structure crossbeam is located as a whole above the floor plates and is rigidly connected to the heel plate to form a box-shaped profile structure.

4. The body structure according to claim 3, wherein the structure crossbeam has an L-shape in section perpendicular to the vehicle transverse direction.

5. The body structure according to claim 4, wherein the heel plate has the L-shape in section perpendicular to the vehicle transverse direction and adapted to the L-shape of the structure crossbeam to form a profile structure that is at least approximately rectangular in section.

6. The body structure according to claim 1, wherein the structure crossbeam is rigidly connected on fastening flanges to the two side sills.

7. The body structure according to claim 1,
   wherein the two rear frame profiles each have a wall oriented at least approximately in a vehicle vertical direction that is frontally rigidly connected to the structure crossbeam,
   wherein the structure crossbeam is rigidly connected to a floor-side wall of each of the two rear frame profiles, and
   wherein the structure crossbeam is frontally rigidly connected to the two side sills.

8. The body structure according to claim 2, wherein the structure crossbeam forms frame-shaped profile structures jointly with each of the two rear frame profiles and the two side sills, wherein further each of the two rear frame profiles is connected to the structure cross beam above the floor plates.

9. The body structure according to claim 8, further comprising closing plates by which the frame-shaped profile structures are closed to form box-shaped profile structures.

10. The body structure according to claim 3, wherein the central tunnel running along a central longitudinal axis that is rigidly connected to the box-shaped profile structure formed from the structure crossbeam and the heel plate.

11. The body structure according to claim 1, wherein the two rear frame profiles are each rigidly connected to a box-shaped structure part situated below the two rear frame profiles.

12. A structure crossbeam for a vehicle body of a motor vehicle, comprising:
two rear frame profiles;
two side sills running in a vehicle longitudinal direction
a floor group situated between the two side sills that are rigidly connected directly to the floor group and extend from the floor group to the rear,
a heel plate rigidly connecting the two side sills and produces a second rigid connection between floor plates situated at various heights to form a box-shaped profile structure, and
a central tunnel that comprises a profile height that decreases minimum height relative to the floor plates toward the rear in relation to the vehicle longitudinal direction.

13. The structure crossbeam according to claim 12, wherein the floor group comprises the heel plate that rigidly connects a first side sill of the two side sills to a second side sill of the two side sills and produces the second rigid connection between floor plates situated at various heights,
wherein the structure crossbeam is situated close to the heel plate.

14. The structure crossbeam according to claim 13, wherein the structure crossbeam is located as a whole above the floor plates and is rigidly connected to the heel plate to form the box-shaped profile structure.

15. The structure crossbeam according to claim 14, wherein the structure crossbeam has an L-shape in section perpendicular to a vehicle transverse direction.

16. The structure crossbeam according to claim 15, wherein the heel plate has the L-shape in section perpendicular to the vehicle transverse direction and adapted to the L-shape of the structure crossbeam to form a profile structure that is at least approximately rectangular in section.

17. The structure crossbeam according to claim 12, wherein the structure crossbeam is rigidly connected on fastening flanges to the two side sills.

18. The structure crossbeam according to claim 12,
wherein the two rear frame profiles each have a wall oriented at least approximately in a vehicle vertical direction that is frontally rigidly connected to the structure crossbeam,
wherein the structure crossbeam is rigidly connected to a floor-side wall of each of the two rear frame profiles, and
wherein the structure crossbeam is frontally rigidly connected to the two side sills.

19. The structure crossbeam according to claim 13, wherein the structure crossbeam forms frame-shaped profile structures jointly with each of the two rear frame profiles and the two side sills, wherein further each of the two rear frame profiles is connected to the structure cross beam above the floor plates.

* * * * *